Figure 1:
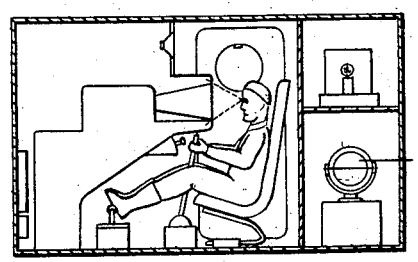

Feb. 3, 1959   J. FAISANDIER   2,871,578
APPARATUS FOR TRAINING AIR PILOTS IN SHOOTING
Filed Dec. 8, 1952   10 Sheets-Sheet 1

Inventor
Jacques Faisandier
By Richard Lund
Ag't

Feb. 3, 1959             J. FAISANDIER             2,871,578

APPARATUS FOR TRAINING AIR PILOTS IN SHOOTING

Inventor
Jacques Faisandier

Inventor
Jacques Faisandier
By Richard ...

Feb. 3, 1959           J. FAISANDIER           2,871,578
APPARATUS FOR TRAINING AIR PILOTS IN SHOOTING
Filed Dec. 8, 1952                              10 Sheets-Sheet 7

Inventor
Jacques Faisandier
By Richard Ward
Ag't

Feb. 3, 1959 J. FAISANDIER 2,871,578
APPARATUS FOR TRAINING AIR PILOTS IN SHOOTING
Filed Dec. 8, 1952 10 Sheets-Sheet 8

Inventor
Jacques Faisandier
By Richard Lord

Feb. 3, 1959 J. FAISANDIER 2,871,578
APPARATUS FOR TRAINING AIR PILOTS IN SHOOTING
Filed Dec. 8, 1952 10 Sheets-Sheet 10

Inventor
Jacques Faisandier
By Richard Guy
Agt

United States Patent Office 2,871,578
Patented Feb. 3, 1959

2,871,578
APPARATUS FOR TRAINING AIR PILOTS IN SHOOTING

Jacques Faisandier, Chatillon-sous-Bagneux, France

Application December 8, 1952, Serial No. 324,698

Claims priority, application France December 18, 1951

25 Claims. (Cl. 35—10.2)

The present invention relates to gunnery training for pilots flying planes having fixed guns. The pilots to be trained are under the supervision of an instructor and are under conditions which are as close as possible to those of actual flight, particularly as regards visual, sound and other conditions.

The object of the invention is to obtain on the ground conditions which resemble as closely as possible those in which a fighter plane is firing at a bomber and also to allow certain operations of a pedagogical kind, as for instance, immobilising the whole apparatus in order to give a detailed explanation for instructional purposes.

The invention is in particular characterised by its capacity of selecting from among the conditions characterising the flight, those conditions to be retained.

These conditions are as follows: (a) visibility, that is to say, the possibility of appreciating the incidence of the fighter plane to the horizon line, its lateral inclination, speed of rotation and the possibility of seeing the target plane in its actual relative position and under its actual relative appearance in relation to the fighter plane and to the fixed elements (ground) or relatively fixed (clouds) of the space in which the combat occurs; (b) the muscular forces required through the reaction of the stick or control column; (c) the noises, noise of the engines varying with the speed, noise of the gun during firing; (d) cock pit; (e) the orientation of accelerations, that is to say, the possibility of noticing whether the piloting is correct during turns; (f) vertical positive acceleration.

As this choice is the result of a compromise between a large mass of complicated material and a more or less exact reproduction of the flight, the invention is obviously not limited to the above-mentioned conditions, some of these conditions being left out and others added.

The invention further relates to apparatus combining all or part of the following conditions for instructional purposes. These are namely (a) the immobilisation at some instant of the whole arrangement giving the instructor an opportunity of explaining in detail the firing conditions; (b) materialisation of future point; (c) recording of shots on target and shots fired; (d) registering or signalling shots on target.

A further object of the invention is to impart to the pilot under training in a clear manner the visual impressions of the elements fixed or relatively fixed in space, such as the line of the horizon, landscape, clouds and their variations in dependence on the assumed result of the operations of the controls carried out by the pupil.

In connection with a particular feature, the invention consists in showing to the pupil the relative displacements of the fixed or relatively fixed elements of space, more particularly, by means of a device articulated on three axes in the manner of a gyroscope, this device being preferably a sphere.

The equator of this sphere represents the horizon; the clouds are represented above and the earth below together with fields and various buildings the scale of which increases as one gets closer to the bottom pole.

The image of a portion of the surface of this sphere is made upon a screen by any suitable means, the selection of the effective portion of the surface projected taking place in dependence on the operations of the controls carried out by the pupil.

The invention consists more particularly in causing the image to appear on the screen by means of television.

The invention also includes the selection of the laws of response and the means utilised for connecting the motions of the sphere with the motions of the controls.

Another object of the invention is to bring to the pupil in a clear manner the visual impressions of the target and of its evolutions depending on the assumed result of the movements of the controls carried out by the instructor.

The invention consists, in relation to this latter object, in the use of a model aeroplane articulated on three axes in the manner of a gyroscope and in making an image of it by any suitable means upon a screen.

One of the main objects of the invention consists in offering the pupil a target the behaviour of which essentially depends on the instructor and is unforeseen as regards the pupil instead of showing him a film or a limited series of films which the pupil soon comes to recognise.

With this aim in view the invention achieves a complete independence between the piloting of the target plane which is left to the instructor and the responses the fighter plane is assumed to give to the action of the pupil on the controls of the latter. An improvement of the invention consists in causing the images to appear on the screens by television.

Another object of the invention is to relate on a single screen the images of the elements fixed or relatively fixed in space and that of the target plane in order to reproduce in magnitude and direction the appearances produced by the relative speeds of translation and rotation.

With these objects in view, the invention consists in the choice of the relation between the action of the student pilot on the control means and the response the fighter plane is assumed to give to such action (transfer function), in the choice of the means and in the means themselves used for this purpose.

Another object of the invention consists in the reproduction by simple means on a screen placed in front of the instructor of the images appearing on the screen placed in front of the pupil.

The invention also consists in the choice of the means and in the means themselves and for obtaining the atmosphere or surroundings and the pedagogical conditions mentioned hereinbefore.

Other objects and features of the invention will appear in the course of the accompanying description wherein will be seen the generic means, certain specific modes of realisation which are novel in themselves being also indicated and both forming an integral part of the invention.

Figure 2:
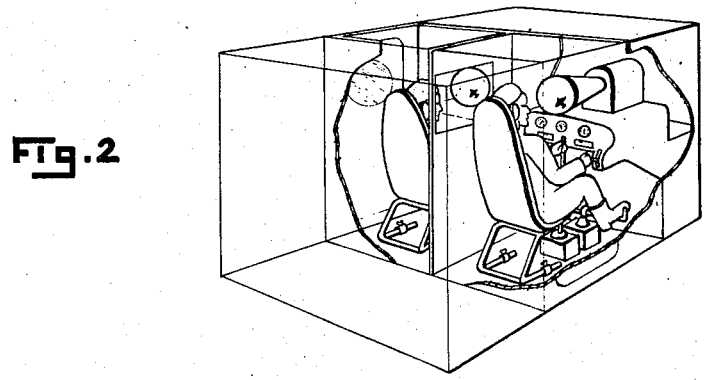
Figure 3:
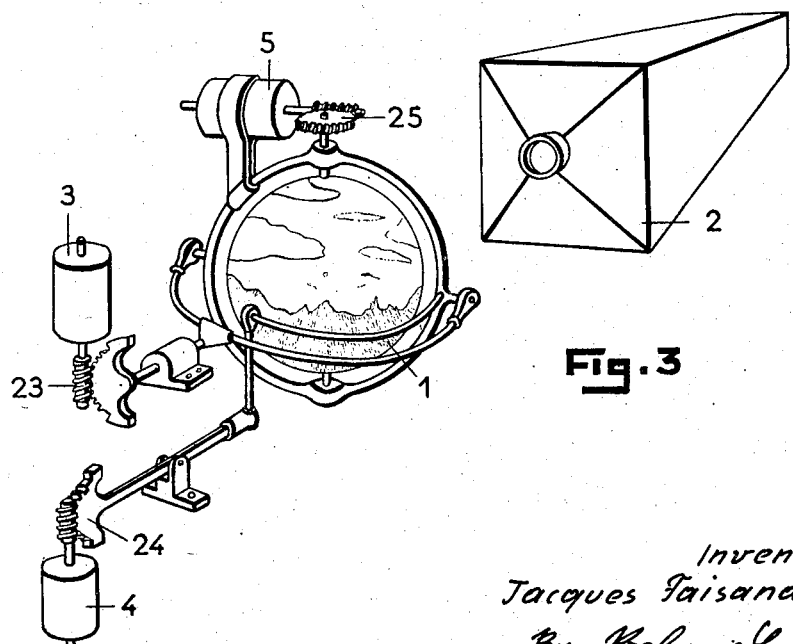
Figure 4:
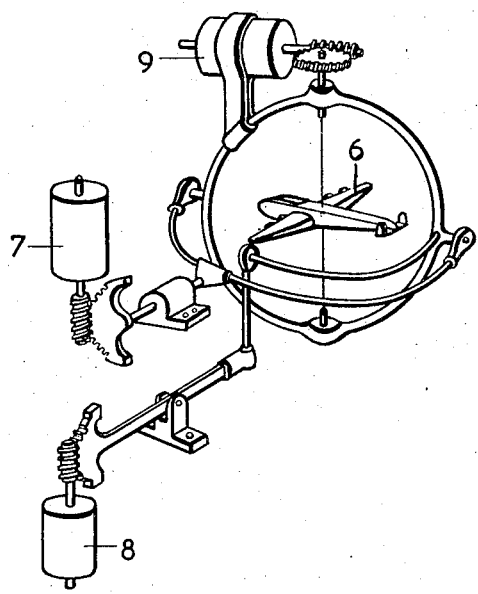
Figure 5:
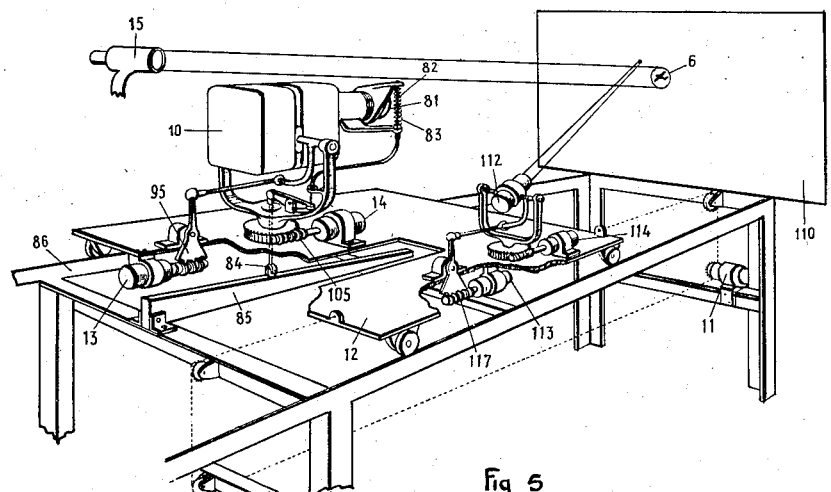
Figure 6:
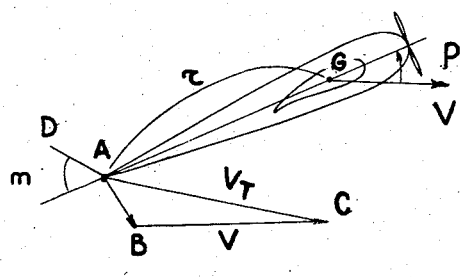
Figure 7:
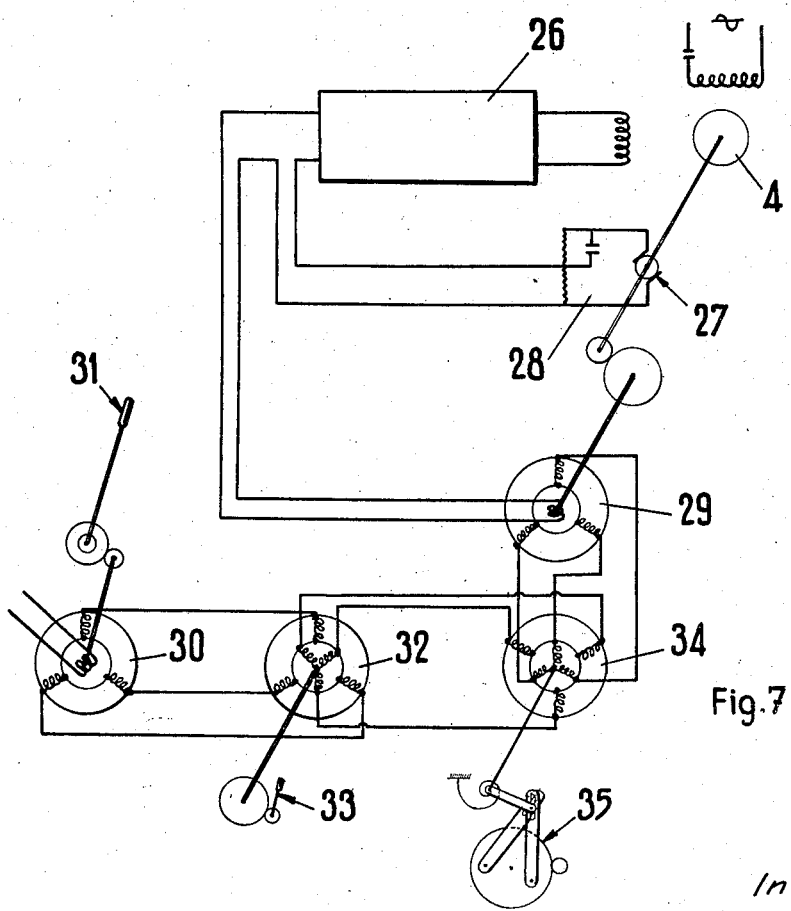
Figure 8:
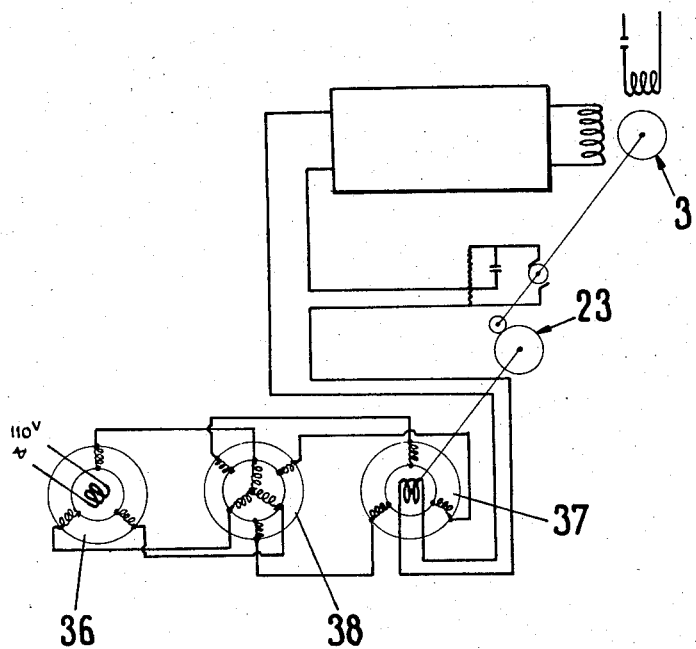
Figure 9:
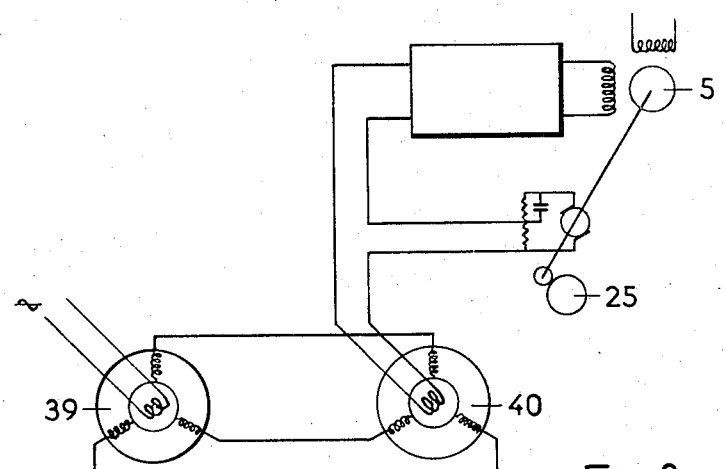
Figure 10:
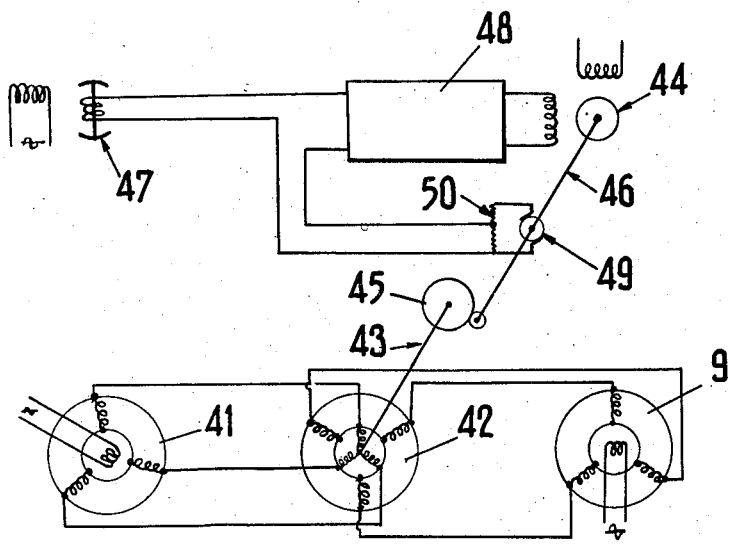
Figure 11:
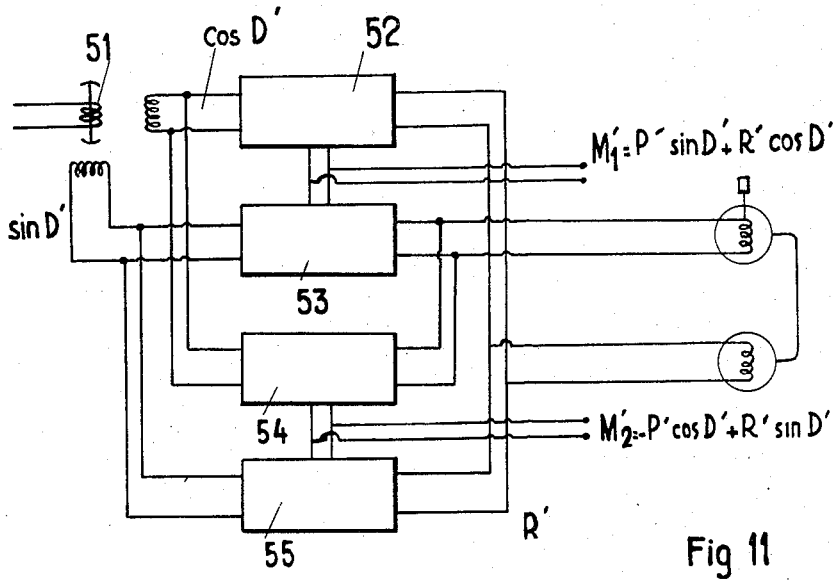
Figure 12:
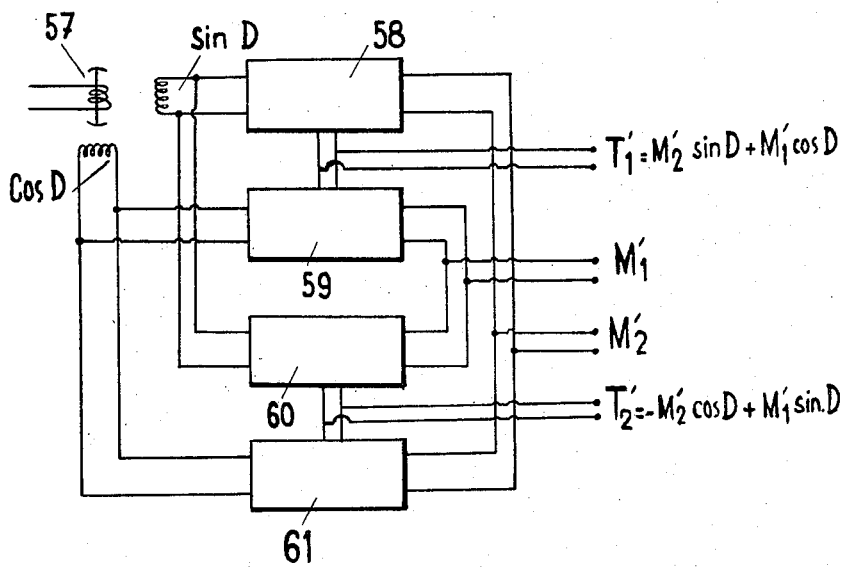
Figure 13:
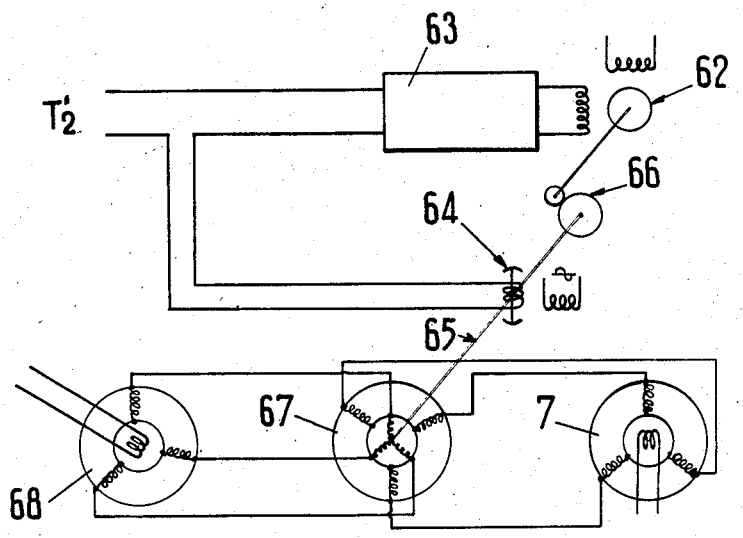
Figure 14:
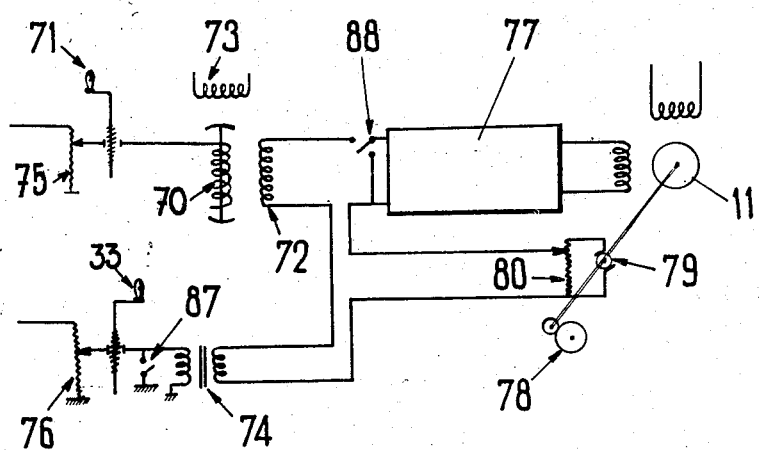
Figure 15:
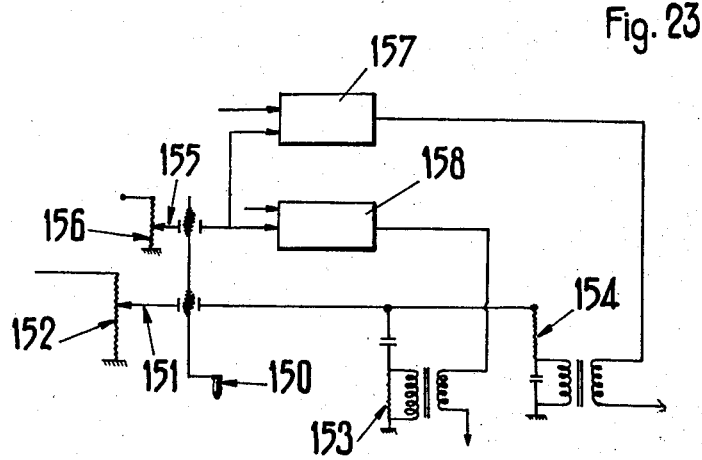

In these drawings:

Figure 1 shows a section of the cock pit of the pupil pilot,

Figure 2 is a perspective view partly in section of the two cock-pits of the pupil and the instructor, Figure 3 is a diagrammatic perspective view of the controls of the sphere of the fixed elements, Figure 4 is a diagrammatic perspective view of the controls of the bomber model, Figure 5 is a diagrammatic perspective view of the device intended to reproduce the relative distance of the bomber and the fighter, with the shift of the future point, whereby the latter term is meant to designate the point that will be reached by the target at the moment the projectile meets the target provided the movements of the target have not undergone a change during the flight of the projectile, Figure 6 is a diagrammatic axial section of a plane arrangement giving a definition of the angles, Figure 7 is a circuit diagram of the device corresponding to the pitching motion of the fighter plane, Figure 8 shows the circuit diagram corresponding to the rolling movement of the fighter, Figure 9 shows the circuit diagram corresponding to the direction movement of the fighter, Figure 10 shows the circuit diagram corresponding to the composition of the relative motions of the two planes about the vertical axis, Figures 11, 12 and 13 represent the circuit diagram concerning the composition of the relative motion of the two planes in relation to one of the two other axes of the model, Figure 14 shows the circuit corresponding to the apparent change of the relative distance of the two planes, Figure 15 is the circuit for indicating the distance.

Figure 16:
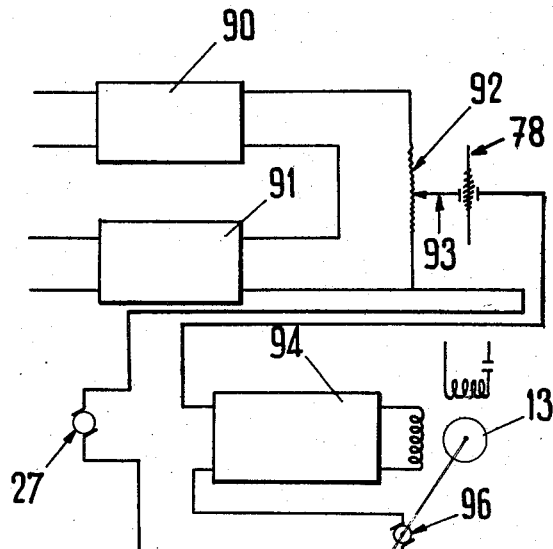
Figure 22:
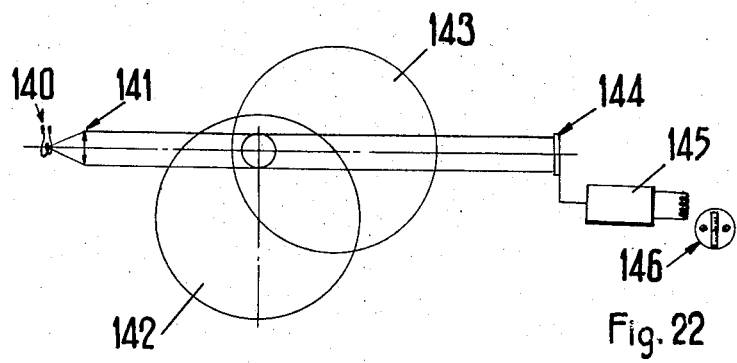
Figure 23:
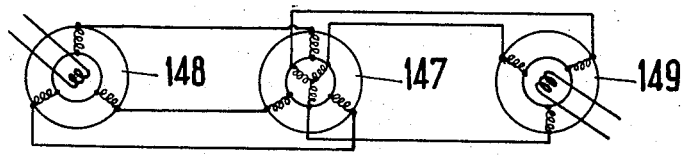
Figure 17:
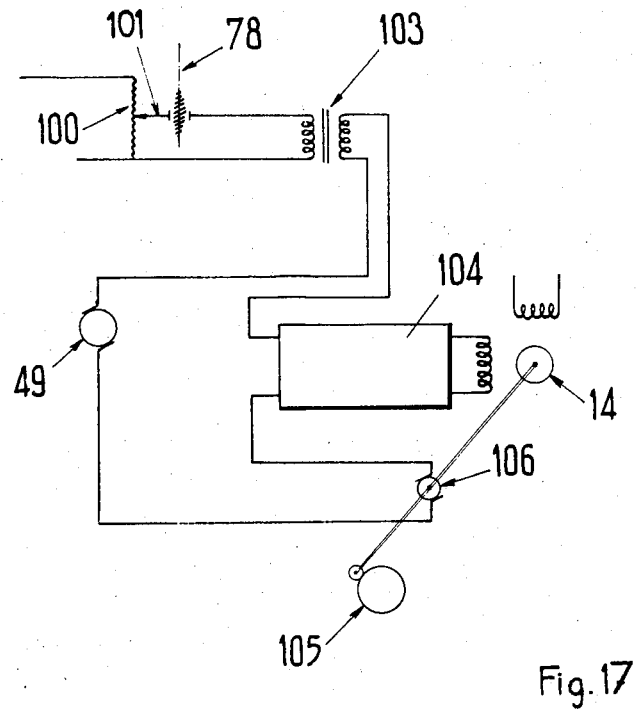
Figure 18:
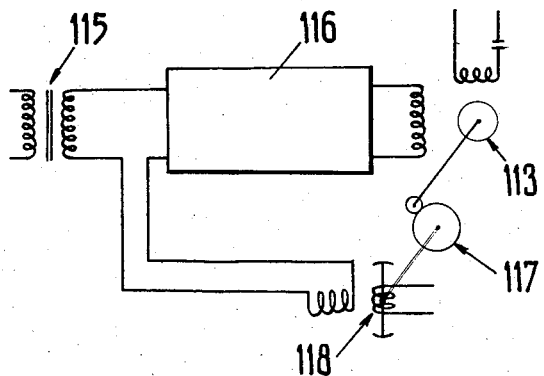
Figure 19:
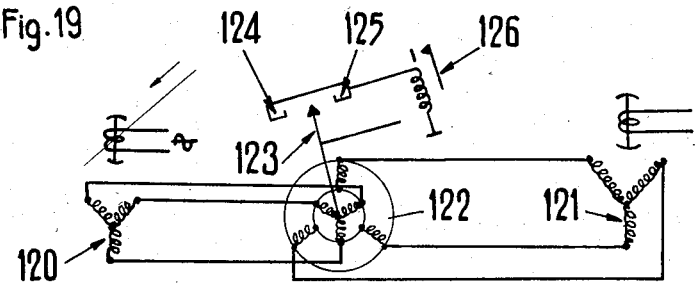
Figure 20:
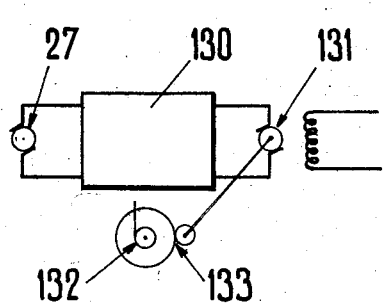
Figure 21:
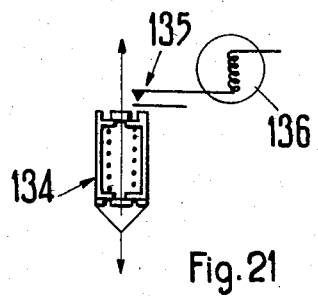

Figures 16 and 17 show the circuit corresponding to the vertical and horizontal shifts respectively of the target in relation to the axis of fire of the fighter plane, Figure 18 shows the circuit relating to the obtaining of the future point, Figure 19 shows the diagram relating to signalling the sideslip, Figure 20 shows the circuit diagram relating to the reproduction of the effects of vertical accelerations, Figure 21 is a diagrammatic representation of the arrangement for signalling too great accelerations, Figure 22 is a diagrammatic representation of the arrangement for recording the shots on the target, Figure 23 is the circuit for the control of the recording of shots on the target.

The pupil is placed in a standard type of fighter cock pit, as illustrated in Figures 1 and 2, this cock pit being modelled as closely as possible to the original so as to give the pupil as much a sense of the real thing as possible.

The control apparatus are reduced to: a control column or joy stick, a rudder bar and throttle lever.

The visual impressions of the pupil are furnished by a screen the images of which reproduce the actual view he would have in flight over a sector for example of 56 degrees vertically and horizontally.

In front of the pupil is placed a cathode ray tube having a screen of 30 centimeters approximately on which appear the horizon and the target plane.

The screen is provided at its centre with a reticule or cross wires or a circle indicating the axis of the plane and functioning in the same manner as that of sights.

The field afforded by this cathode ray tube vertically and horizontally is in the present instance 56 degrees.

The distance of the tube from the eye of the pilot is 30 centimetres.

This apparatus has the disadvantage of accustoming the eye to 30 centimetres instead of infinity as in the case of actual firing.

It would be possible however to adopt an optical system, for example, two convex lenses placed before each eye, this system returning the image to infinity.

The sounds are made by an electronic system acting on a loud speaker.

The instructor is placed in a cabin which is similar in all respects to that of the pupil.

A second cathodic tube repeats the image of the first tube.

The instructor controls in fiction the target plane by means of the control stick, the rubber bar and alters its speed by means of a throttle lever.

He has at his disposal a number of switches enabling him to immobilise the whole system (for giving explanations to the pupil) and to send the signal of the future point, and also the general starting and stopping switches.

The two cabins are side by side with a shutter between so as to facilitate explanations between the instructor and the pupil.

A telephone is also provided between the pupil and the instructor.

There will of course be no sound system for the target plane.

Figure 3 shows clearly how the visual impressions of the earth are brought to the pilot.

A sphere 20 centimetres in diameter approximately is articulated on three axes OXYZ after the manner of a gyroscope.

The equator of this sphere represents the horizon, above are shown the clouds and below the earth with some fields and various buildings, the scale of which increases the nearer one gets to the bottom pole.

An iconoscope 2 scans a small portion of this sphere (angle at the centre of 56 degrees), illuminated by a projector not shown and sends the image to the pilot through the medium of the cathode ray tube and suitable electronic amplifiers.

The motions are produced by means of electric motors 3, 4 and 5 controlled by the positions of the control column and of the rudder bar belonging to the pupil.

The control of these motions and the laws of response are effected by means of electronic amplifiers, selsyns and control dynamos not shown in Figure 3 and referred to later on.

This apparatus is located at the rear of the pupil and the instructor beside the apparatus related with the target as shown in Figures 1 and 2.

The target which is represented by means of a model plane 6 must be able to move about in all directions.

It is therefore supported by means of a system articulated on three axes $o'x'$, $o'y'$, $o'z'$ as seen in Figure 4.

All its movements are controlled by electric motors 7, 8 and 9, details of the controls of which will be explained later on.

Scanning of the target is effected by means of an iconoscope 10 mounted on a carriage 12, the latter being capable of longitudinal displacement so as to produce the effect of distance, as seen in Figure 5. The iconoscope is mounted on a universal joint arrangement.

The longitudinal motion is produced by the motor 11 which displaces the carriage 12 mounted upon rails.

The model 6 does not have any translatory motion possessing only the three rotary motions provided by the aforementioned articulations. The relativity of height and azimuth motion is thus produced by the iconoscope 10 owing to the two scanning motions controlled by motors 13 and 14.

The controls of these motors will be explained hereinafter.

The model 6 is illuminated by means of the projector 15.

The images which are given by the two iconoscopes 2 and 10 are mixed on the screens of the cathode tubes of pupil and instructor reconstituting the visual impressions provided by the elements of space and the target.

Although this double reconstitution may be effected by means of a double direct projection on a screen, the method effected by means of television as described implies considerable progress in view of the results obtained with such simple means. In particular, the presence of a target which has no translatory motion reduces the complexity of the arrangement. This simplifies the mechanical devices and reduces the overall dimensions with a considerable saving in costs.

As regards the controlling of the motor 4 corresponding to the pitching motion of the fighter, the invention is in the first instance characterised by the selection of simplifying hypotheses leading to a transfer function showing with sufficient approximation the actual movement of the fighter plane resulting from the action of the pupil pilot on the controls, which transfer function can be calculated automatically by means of relatively simple arrangements. In the present instance of pitch, a transfer function A will be taken according to the invention, the reciprocal $$\frac{1}{A}$$

of which has the form:

$$\frac{I}{A} = \frac{Km}{p} = I + ap + bp^2$$

where, $m$ is the depth component of the angle of the control stick, that is to say, the inclination of the elevator in relation to the axis of the plane, P is the incidence of the plane in relation to the horizontal, both as represented on Fig. 6, $p$ represents either the symbol $d/dt$ of Laplace's equations (appearing in Complement de Mathematiques par Angot, published by the Revue de l'Optique, 3 Boulevard Pasteur, Paris, 1949) or $iw$, $i$ being $v-1$ and $w$ the angular frequency, K, $a$ and $b$ being constants depending on the characteristics of the plane.

This calculation may be effected by any suitable arrangement. According to the invention the following arrangement will be used for controlling the motor 4 controlling by means of a suitable reduction gear 24 the rotation about the axis $oy$ shown in Figure 3.

The motor 4 is controlled by the electronic amplifier 26, which may be of the well-known type as described at page 128 of Servo Mecanismes by Columbani Raymond, published in 1949 by Societe d'Edition d'Enseignement Superieur, 99 Boulevard St. Michel, Paris, or at page 121 of the August 1951 issue of Electronics, published by the McGraw-Hill Publishing Co. and is shown in Figure 7. On its shaft is mounted a tachometer dynamo 27 the output voltage of which is passed to the input through a resistance-capacity arrangement 28 arranged as shown in the figure.

The input voltage is formed by means of two selsyns 29 and 30 secured to the shaft of the motor 4 and the depth control of the control column 31, respectively.

In order to take into account the effect of the speed of the plane on the incidence of the plane in relation to the horizontal, a differential selsyn 32 is arranged in the circuit of the selsyns and controlled by the throttle lever 33 belonging to the pupil by means of a suitable reduction gearing. This differential selsyn effects an auxiliary rotation of motor 4 additional to the rotation corresponding to component $m$ of the angle of the control column, in such a way that it increases the final incidence of the plane for an increase in speed, and diminishes it when the opposite is the case.

In a similar manner, any variation on the aileron controls by means of the control column of the pupil in either direction starting from the middle position decreases the final incidence of the plane.

So as to take this effect into account a differential selsyn 34 is interposed into the input signal circuit of the amplifier and controlled by a mechanical device 35 shown schematically.

This mechanical device 35 controlled by the rudder bar of the pupil is intended to turn the controlling shaft of selsyn 34 through a certain angle always in the same sense, this being represented schematically by a disc controlled by the rudder bar and carrying two levers acting on a crank keyed to the shaft of the selsyn 34 and returned by means of a spring.

In relation to the control of the rolling of the fighter plane (motor 3 shown in Figure 3), the control solution is based on the choice of similar hypotheses as illustrated in Figure 8.

The transfer function has the same algebraic form as that for pitch, the coefficients having merely different significations.

The control signal is produced on the one hand by a selsyn 36 fixed to the control column (component corresponding to the control of the ailerons) and on the other hand, by a selsyn 37 controlled by the motor 3. Account is taken by means of the differential selsyn 38 controlled by the rudder bar acting on the rudder so that any action on and of the rudder has an effect on the inclination of the plane.

The remaining elements of Figure 8 are similar to those shown in Figure 7 so that they do not have to be described.

As regards the direction motion of the fighter plane the simplifying hypotheses selected according to the invention give a transfer function of the form:

$$\frac{I}{K'p + K''p^2}$$

K' and K'' being experimental components, $p$ having the same significance as indicated above.

One of the objects of the present invention consists in controlling the motor 5 shown in Figure 3 which acts on the axis $oz$ of the sphere by means of a suitable gearing 25, as follows and to be seen in Figure 9.

As in the foregoing Figures 7 and 8 there is provided an electronic amplifier, a tachometer dynamo and its circuit with resistance-capacity arrangement, the input voltage of the amplifier being in this case provided by means of the selsyn 39 controlled by the rudder bar acting on the rudder and the selsyn 40 controlled by the control column (component corresponding to the movement of the ailerons), the ailerons having a tendency to turn the plane to the side where it inclines.

The motions of the target model 6 are produced as follows:

According to the invention a transfer formula is adopted for the rotation about the axis $o'z'$ in Figure 4 which neglects the transitory motion of the target and merely takes into consideration the constant rotation produced after overcoming the transitory motion.

The rotation of the model 6 about the axis $o'z'$ of Figure 4 is the sum of the rotation of the sphere about the axis $ox$ of Figure 3 and the rotation the instructor would impart to the actual target with the motion of his rudder bar.

The following arrangement constituting one of the objects of the invention enables this summation to be effected.

The motor 9 of Figure 4 is in this instance a selsyn, shown in Figure 10, rotating through an angle equal to the sum of the rotation of the selsyn 41 actuated by the rotation of the sphere about the axis $oz$, that is, actuated by the motor 5 shown in Figure 3 and of the differential selsyn 42.

The selsyn 42 is driven by the shaft 43 actuated in turn by the motor 44 through the medium of a reduction gear 45 and the shaft 46.

The instructor controls with his rudder bar the selsyn 47 which through the amplifier 48 and the motor 44 controls the shaft 46 which then rotates at a speed which is a function of the angle of rotation of the rudder bar.

The electronic amplification is provided with a control by means of a tachometer dynamo 49 enabling the speed of the output shaft to be exactly proportional to the input voltage.

The potentiometer 50 at the output of the dynamo 49 enables the ratio of the speed of rotation of the shafts 46 or 43 to the angle of the rudder bar to be adjusted with exactitude.

The control of the motors 7 and 8 of the target model has the feature in this case that these motors are the pitch motor and the rolling motor respectively or conversely according to the angle at which the model 6 is present under the influence of the rotation imposed on it by the selsyn 9.

The invention thus uses an arrangement which allows a suitable combination of the relative rotations of the various systems of reference.

One embodiment of this arrangement constituting one of the objects of the present invention is given hereinafter.

The shaft 43 shown in Figure 10 rotating at a speed proportional to the angle of the rudder bar of the instructor, actuates a two-phase selsyn 51, shown in Figure 11, that is to say, the stator windings of which are two in number and mounted at 90° in relation to each other. It would also be possible to envisage the provision of a standard three-phase selsyn with a phase transformer.

Each of the windings produces an alternating voltage having an amplitude cos $D'$ in one case and sin $D'$ in the other case $D'$ being the angle that defines the angular position of the selsyn 51. These voltages are passed as indicated in the figure to four electronic voltage multipliers 52, 53, 54 and 55, which may be, for example, of the kind described in the above fully identified publications "Servo Mecanismes" or "Electronics," and operate to give after suitable additions the values:

$$M'_1 = P' \sin D' + R' \cos D'$$
$$M'_2 = P' \cos D' + R' \sin D'$$

$P'$ and $R'$ being voltages given by selsyns controlled by the longitudinal component (trim of target plane) and lateral component (inclination of the target plane) of the angle imparted to the control column by the instructor.

On the other hand, the motor 5 of Figure 3 is made to operate, as seen in Figure 12, a two-phase selsyn 57 the voltages of which proportional to the sine and cosine of the angle of rotation of the sphere about $oz$ are passed to four electronic multipliers 58, 59, 60 and 61 giving after suitable addition:

$$T'_1 = M'_2 \sin D + M'_1 \cos D$$
$$T'_2 = M'_2 \cos D - M'_1 \sin D$$

The reciprocal influence is thus obtained of the two control systems of the motors 7 and 8 of the target model in the form of voltage which is converted into angles by using the arrangement shown in Figure 13.

Figure 13 shows the control of the motor 7 which controls the rotation about the axis O'X' seen in Figure 4. In Figure 13 a two-phase motor 62 controlled by an electronic amplifier 63 actuates a selsyn 64 the stator of which is excited with alternating current. Its rotor produces a voltage proportional to its displacement in relation to a reference angle (for small angles which is the case). The amplifier 63 is controlled by the voltage $T'_2$.

When both the input voltages are equal and opposite the two-phase motor stops and the rotation of the output shaft 65 will be equal to the angle sought. The reference 66 refers to a reduction gearing.

This angle is added to the angle given by the rotation of the sphere by a standard summation circuit. The selsyn 67 is actuated by the shaft 65 and the selsyn 68 by the rotation of the motor 3 shown in Figure 3. Under these conditions the selsyn 7 will suitably effect the rotation of the target model about the axis $o'x'$ shown in Figure 4.

In respect of the control of motor 8 which controls the rotation about the axis $o'y'$ of Figure 4, the new circuit is the same as that shown in Figure 13, and it must be noted that the selsyn 7 becomes the selsyn 8, the voltage feeding the equivalent electronic amplifier to 63 being in this case the voltage $T'_1$ obtained by the circuit of Figure 12, and finally the selsyn corresponding to selsyn 68 is a selsyn driven by a motor 4 shown in Figure 3.

By means of the various circuits described it has been possible to reproduce the relative movement of rotation in space of one plane in relation to another.

It is now necessary to reproduce the variations of apparent size of the target, that is, the law of distances as a function of the data already enunciated and of the respective speeds of the fighter and target planes.

These speeds are directed along the axis $ox$, as shown in Figure 3, in the case of the fighter and axis $o'x''$ (axis of longitudinal symmetry of the target) in the case of the target.

Under these conditions:

Speed of approach = $V_A - V_B \cos (ox, o'x'')$

As shown in the embodiment of Figure 5 the variations of the distances are made on a reduced scale. The iconoscope 10 is placed on a carriage with rollers controlled electrically, its speed corresponding to:

$$K(V_A - V_B \cos (ox, o'x''''))$$

K being the similarity factor and indicating the ratio between the supposed dimensions of the fictitious airplane target and the real dimensions of the model target.

Assuming that the combat distances vary between 1600 and 200 metres and giving for instance the travel of the carriage 12 a maximum distance of 1.6 metres, the ratio of similarity will then be thousandths. The minimum distance of the iconoscope 10 to the model 6 will under these conditions be 20 centimetres.

The model 6 will be made to one thousandth size or scale, that is to say, in the case of a bomber plane of 40 metres, the size will be 40 millimetres.

It will be understood of course that this distance variation which in itself represents one of the features of the training device according to the invention may be brought about by any suitable arrangement but more especially by means of the arrangement as follows which constitutes one of the objects of the present invention.

On a shaft rotating at the speed of the vertical shaft of the target model, and thus actuated by the motor 9 shown in Figure 4, is fixed, as shown in Figure 14, the rotor 70 of a two-phase selsyn. The rotor 70 is fed by a voltage controlled by the throttle lever 71 of the instructor and therefore proportional to $V_B$. The winding 72 of the stator will give $V_B \cos (ox, o'x'')$ while the second winding 73 will give $V_B \sin (ox, o'x'')$ to be used later.

In the circuit of the winding 72 is the secondary of a transformer 74 whose primary is fed by a voltage proportional to $V_A$, that is to say, controlled by the throttle lever 33 of the pupil.

75 and 76 are potentiometers.

In the circuit giving $(V_A + V_B \cos (ox, o'ox''))$ is the amplifier 77 controlling the motor 11 shown in Figure 5, that is, the motor which actuates by means of a reduction gear 78 of suitable speed, the carriage 12 of the iconoscope 10 at the speed desired.

To this shaft is secured the tachometer dynamo 79 controlling the amplifier so as to obtain exactly the speed of the output shaft proportional to the input voltage. The potentiometer 80 allows the ratio to be regulated.

On the other hand, the relative displacement of the iconoscope 10 in relation to the model 6 necessitates the regulation of the objective of the optical system of the iconoscope.

This is achieved by means of the following arrangement:

The objective 81 is mounted as shown in Figure 15, on a screw having a large pitch so that its entire travel can be brought about with a quarter of a turn approximately.

It is rotationally driven by means of a lever 82 supported by means of a spring 83 and a roller 84 on a cam 85 placed on the rolling path 86 of the iconoscope 10.

According to the profile of the cam 85, the roller 84 and, hence, the lever 82 is more or less raised as the carriage 12 of the iconoscope moves along the rolling path 86, the housing of the spring 83 being integral with the iconoscope. Lever 82 controls the focusing of the objective lens assembly. Thus, the objective can be regulated in automatic manner at any distance.

For pedagogical purposes, a switch 87 is provided as may be seen in Figure 14 and is automatically closed when the pupil brings the throttle lever to zero.

The voltage proportional to speed $V_A$ is cancelled when the pupil brings the throttle lever to zero, as the voltage $Va$ is controlled by the throttle lever 33.

The target can then be controlled appearing rapidly at 1600 metres.

The exercise commences with a distance of 1600 metres between the fighter and the target.

It may be an advantage to allow the pupil a little time for adapting himself, corresponding to the time for making contact during which there is no change of distance. This is achieved by means of a two-way switch 88 which short-circuits the input circuit of the amplifier and is controlled by the instructor.

The relative displacement of the target in relation to the axis $ox$ of the fighter is produced according to the invention as follows:

Designating the angles of rotation of the model in relation to the three axes $o'x'$, $o'y'$, $o'z'$ in Figure 4 by $R'_I$, $P'_I$, $D'_I$, the following expressions are obtained according to the invention:

For the angular speed of the vertical displacement $$\frac{VB}{L}(\sin R'_I, \sin D'_I - \sin P'_I \cos D'_I) - \frac{dP}{dt}$$

$$\frac{dP}{dt}$$

being the speed of rotation about the axis Oy of the sphere.

For the angular speed of the horizontal displacement $$\frac{VB}{L}\sin D'_I + \frac{dD}{dt}$$

$$\frac{dD}{dt}$$

being the speed of rotation about the axis Oz of the sphere.

VB being still the speed of the target plane and L the supposed distance between the fighter and the target.

$P'_I$ and $R'_I$ are furnished by selsyns actuated by the motors 7 and 8 of Figure 4. Their rotors being excited with alternating current, the windings of the stators will give sin $P'_I$ and sin $R'_I$.

The windings 72 and 73 of the circuit of Figure 14 will give $V_B \cos D'_I$ and $V_B \sin D'_I$.

The electric multipliers 90 and 91 of Figure 16 fed by voltages ($V_B \sin D'_I$ and $\sin R'_I$) and $V_B \cos D'_I$ and sin $P'_I$ respectively give $$\text{Sin } R'_I \sin D'_I - \sin P'_I \cos D'_I$$

which is multiplied by $$\frac{VB}{L}$$

owing to the potentiometer 92 the moving contact 93 of which is controlled by a shaft 78 the speed of which is proportional to that of motor 11 driving the carriage of iconoscope 10. In the circuit of the resultant voltage, is inserted the control dynamo 27 of motor 4 shown in Figure 3 and the amplifier 94 controlling motor 13 shown in Figure 5, said motor 13 controlling through the reduction gearing 95 the scanning of the iconoscope 10 in the vertical direction.

On the shaft of the motor 13 is arranged the control dynamo 96 with its potentiometer not shown by means of which proportion is obtained between the input voltage and the output speed of rotation.

The relative horizontal displacement of the target in relation to the axis $ox$ of the fighter is obtained according to the invention as follows, referring to Figure 17:

The voltage $V_B \sin D'_I$ given by the winding 73 of Figure 4 is multiplied by $$\frac{VB}{L}$$

owing to the potentiometer 100 the moving contact 101 of which is controlled by the shaft 78 driven by the motor 11 of the carriage of the iconoscope 10. The resulting voltage feeds the primary of a transformer 103 the secondary circuit of which contains the amplifier 104 and the control dynamo 49 mounted on the shaft of the motor 5 of Figure 3.

The amplifier 104 feeds the motor 14 controlling the horizontal scanning of the iconoscope 10 through the reduction gear 105. The shaft of motor 14 drives the tachometer control dynamo 106.

The instruction arrangement must allow materialisation of the future point, that is to say, of the point at which the target would be without change of speed or direction at time $$t = \frac{L}{Vmp}$$

L being the distance, $Vmp$ the average velocity of the projectile (in the system connected with the fighter), zero time being the moment of departure of the projectile.

For this purpose, the model of the target is surrounded by a white screen 110 as shown in Figure 5.

The future point is materialised by its co-ordinates on said screen by a luminous spot, the co-ordinates $dy$ and $dz$ of which in relation to the target (seen from the iconoscope and the fighter) are taken angularly so as to be independent of the distance that is, of the parallax.

On the carriage 12 of iconoscope 10 is a projector 112 focused on said screen to produce said spot and controlled vertically and horizontally by motors 113 and 114 so as to obtain angle of rotation corresponding to $dy$ and $dz$ and to obtain a projected spot corresponding to $dy$ and $dz$ automatically increased by the parallax corrections of the iconoscope.

When the auxiliary projector is illuminated, the future point appears in luminous manner on the cathode tube of the pupil pilot.

The motors 113 and 114 are according to the invention controlled as follows:

The following expressions will be adopted:

Angular vertical co-ordinate.

$$\frac{VB}{Vmp}(\sin R'_I \sin D'_I - \sin P'_I \cos D'_I)$$

Angular horizontal co-ordinate.

$$\frac{VB}{Vmp}\sin D'_I$$

which the invention enables obtaining in the form of alternating voltages by the circuit shown in Figures 14 and 16.

Through the medium of a suitable transformer 115 shown in Figure 18, of ratio $$\frac{K}{Vmp}$$

the first of these two voltages feeds the amplifier 116 which supplies the motor 113 controlling through the reduction gearing 117 the projector 112. On the shaft of the motor 113 is fixed the selsyn 118 excited alternatingly, its rotor producing a voltage proportional to the displacement which is passed to the input of the amplifier.

When the two input voltages are equal and opposite the motor 113 stops and the output shaft will have a rotation equal to the angle sought.

A second similar circuit will be used for controlling the motor 114, feeding the transformer with the voltage $VB \sin D'_l$.

It is possible for the training device according to the invention to be provided with an arrangement for signalling serious piloting errors liable to bring the fighter plane into dangerous positions.

The sideslip indicator according to the invention detects the difference between the rolling angle and the angle of apparent vertical.

$$\frac{\text{Average speed} \times \text{speed of turning}}{g}$$

beyond a certain threshold, the indicator will operate a warning device.

The following circuit constituting one of the objects of the present invention is obtained as follows:

The selsyn 120, shown in Figure 19, is driven by the rolling motor 3 of the fighter plane and the selsyn 121 by the rudder bar with a suitable multiplication.

The differential selsyn 122 detects the angle difference by any suitable means, represented in this instance by a moving contact 123 oscillating between two fixed contacts 124 and 125 located in the circuit of a ringing arrangement 126 or a luminous signalling arrangement or a general or partial break arrangement.

In order to make things appear as real as possible to the pupil, according to the invention, sounds are provided by an amplifier so as to produce the sensation of actual flight.

These sound effects are of two kinds, or the noise of the engine varying with the speed and the noises from the guns during firing periods.

One oscillator produces a voltage of complex form reproducing the noise from the engine while a second oscillator produces a voltage reproducing the firing noises.

These two voltages are mixed, amplified and energise a loud speaker.

The sharpness and the amplitude of the engine noise are controlled by means of a double potentiometer connected to the throttle lever 33.

The firing button engages a relay which connects the firing oscillator during the firing periods.

The amplifier is of standard type: an oscillator tube for each noise, a mixer tube, an amplifying tube, two push-pull power tubes with transformer dephasing.

The amplifier may be used for an inter-phone by operating a reversing switch, a special tube effecting amplification of the microphone.

The effects of vertical acceleration are likewise reproduced in order to enhance the impression of actuality.

The pupil pilot seated in his seat is held by means of two shoulder straps and whose pull in downward direction is proportional to the vertical acceleration of the plane.

This vertical acceleration is taken proportional to the average speed of the fighter and to the speed of rotation about $oy$.

This variation will be taken at the terminals of the tachometer dynamo 27, shown in Figures 3 and 20, of the motor 4 controlling the trim of the plane. This voltage is supplied to the amplifier 130 and through it to the armature of a continuous current motor with independent excitation.

The motor 131 controls through the reduction gear 133 the winch 132 acting on the shoulder straps.

A dynamometer 134, shown in Figure 21, placed between motor 131 and the shoulder straps, and with calibrated band possesses for when the force exerted exceeds the calibrated amount an electric contact 135 which closes and allows current to pass to a bell or other warning signal device 136. This device is put in action during too great a vertical acceleration.

The arrangement according to the invention is completed by a device for recording the shots on the target and a counter for the shots on the target these and the method of embodying same also being objects of the invention.

The shot will be on the target when the future point is located in the axis of the cathode tube screen.

Said axis corresponds with the axis $ox$ of the fighter which is likewise the axis of the gun.

This condition is realised when the incidences (vertical and horizontal) of the projector 112 of the future point and of the iconoscope 10 are equal and in the same sense, shown in Figure 5, taking into consideration the correction for parallax (projector-iconoscope) which correction is automatically obtained by reason of the mounting of the projector 112 on the carriage 12 of the iconoscope so that the projector and iconoscope move together.

The recording device works in the following manner:

Each time a shot is fired it lights up a small lamp 140 placed at the focus of a lens 141, shown in Figure 22.

The beam which is produced is projected on to two opaque discs 142 and 143 each provided with a single hole and represented by turning into the plane of the figure.

The beam only traverses them when the two holes are both situated on the beam.

In such case, if the lamp is lit by the shot fired, it excites a photo-electric cell 144 which amplified by the amplifier 145 operates a counter 146 of shots on the target.

The disc 142 is operated by a differential selsyn 147, shown in Figure 23. It turns an amount equal to the difference between the movements of two selsyns 148 and 149 controlled by the motor 14 of iconoscope 10 and the motor 114 of the projector of the future point respectively.

This first system is thus connected with the horizontal movement of these apparatus, the second system actuating the second disc 143 being connected with their vertical movement (motor 13 and 113).

There can only be excitation of the photo-electric cell when the two discs are in "open" position, that is, when the fighter plane is in a favourable position for firing.

A separate counter records the totality of the shots fired.

The firing system is effected by relaxation oscillations of electronic tubes, while the counter of shots may be of any suitable known kind.

When the counter records a shot on the target, it sends through a relay a current impulse into a very powerful lamp 15 whose beam lights up the target at that instant.

This can be easily effected as the target is fixed, the projector 15 being also fixed.

A firing guide may be provided to effect the range corrections vertically and horizontally, by means of an apparent spot on the screen, in the form of a circle the radius of which is inversely proportional to the assumed distance of the target and whose average displacement will be equal to the corrections it is sought to obtain.

According to the invention the following angular corrections which are proportional are effected:

Vertically—

To the speed of rotation of the target about the axis $oy$ of the fighter.

Horizontally—

At the speed of rotation of the target about the axis $oz$ of the fighter, the proportional factor being:

$$\frac{L}{V_{mp}} = \frac{\text{distance fighter target}}{\text{average speed of the projectile}}$$

It is known that the plates of a cathode tube act on the luminous spot and control its linear displacement.

The problems the student pilot is confronted with consist in (1) Bringing the target into the circle,
(2) Suitably adjusting the diameter of the circle, and
(3) Firing at the target.

The arrangement is as follows, see Figure 24:
The handle 150 for marking the distance gives a voltage $$\frac{1}{L}$$

as a function of the position of the cursor 151 of the potentiometer 152.

This alternating voltage is phase shifted to the front and the rear by the resistances 153 and 154 associated with two condensers to obtain a circle (Lissajoux curve) on the cathode tube.

At the same time as the distance handle 150 is being turned a cursor 155 is displaced on a second potentiometer 156 wound so as to give a voltage proportional to the distance.

This voltage is passed to two electronic multipliers 157 and 158 also receiving the voltages from the terminals of the tachometer dynamos 49 and 27 respectively.

A continuous voltage is obtained at the output which, added to the two first phase-displaced voltages gives voltages which are made to act on the vertical and horizontal plates respectively of a cathode tube which, under these conditions, will show, as has been indicated, an apparent spot in the form of a circle the radius of which is inversely proportional to the distance and whose average displacement will be equal to the corrections it is sought to obtain.

An independent iconoscope scans this image and passes it to the cathode tube of the fighter plane.

The firing guide is one of the training devices for the student pilot so that he may learn to use the firing guides of real planes which are based on other principles.

(1) Bringing the target into the circle,
(2) Adjusting the diameter of the circle suitably,
(3) Firing on the target.

I claim:

1. In an apparatus for gunnery training for pilots flying planes having fixed guns, in which the image of a target model and a representation of the fixed elements of space are projected onto a screen directly in front of the student pilot, and having means for imparting to said representation a motion corresponding to the imaginary relative motion of the imaginary plane controlled by the student pilot in relation to said fixed elements of space, as a function of the movements of the student controls effected by the student pilot, the provision of means for imparting to the image of the target model variations of size and of appearance and a motion corresponding to the imaginary relative positions of flight of the imaginary plane controlled by the teacher pilot in relation to said fixed elements of space and to the movements of the imaginary plane controlled by the student pilot, as a function of the movements of the teacher controls effected by the teacher pilot and of the student controls effected by the student pilot.

2. In the apparatus as claimed in claim 1, a screen placed before the teacher pilot, and means for projecting onto said screen before the teacher pilot the representation of the fixed elements of space and of the target model.

3. In the apparatus as claimed in claim 1, the provision of means for detecting the difference between the rolling angle and the angle of the apparent vertical thereby to indicate when the imaginary plane controlled by the student pilot has been brought into dangerous positions of flight.

4. In the apparatus as claimed in claim 1, the provision of a computer for the assumed vertical acceleration, a winch, shoulder straps for the student pilot, and means for correlating said vertical acceleration with the action of said winch on said straps.

5. In the apparatus as claimed in claim 1, the provision of a firing guide arrangement, including means to project on the screen a circular spot, means to vary the diameter of said spot as a function of the relative distance as estimated by the student pilot, and means to imput a motion to said spot as a function of the relative movements of the imaginary plane controlled by the student pilot in relation to the movements of the imaginary plane controlled by the teacher pilot.

6. In an apparatus for gunnery training for pilots flying planes having fixed guns, in which the image of a target model and a representation of the fixed elements of space are projected onto a screen directly in front of the student pilot, and having means for imparting to said representation a motion corresponding to the imaginary relative motion of the imaginary plane controlled by the student pilot in relation to said fixed elements of space as a function of the movements of the student controls effected by the student pilot, the provision of a target model, and of means for imparting to said target model rotations corresponding to the imaginary relative rotations of the imaginary plane controlled by the teacher pilot in relation to said fixed elements of space and to the movements of the imaginary plane controlled by the student pilot, as a function of the movements of the teacher controls effected by the teacher pilot and of the student controls effected by the student pilot.

7. Apparatus as claimed in claim 6, characterised in that the target model is suspended by means of a universal arrangement and the movements of the target model in relation to the three directions of space are controlled by three electric motors respectively.

8. Apparatus as claimed in claim 7, characterised in that the motors controlling the motions of the target model about two horizontal axes are controlled by means of a calculating arrangement taking into account the relative rotations of the systems of reference of the target model and of the sphere.

9. In the apparatus as claimed in claim 6, the provision of means to effect the projections onto the screen by television.

10. In the apparatus as claimed in claim 9, the provision of an iconoscope for the projection on to the screen of the image of the target model and of two electric motors controlling respectively the iconoscope in azimuth and vertically, and of means to control, respectively, said motors as a function of the relative rotation of the target model in relation to the axis of the imaginary plane of the student pilot.

11. In the apparatus as claimed in claim 9, the provision of a projection arrangement, a screen in the immediate vicinity of the target model and on which said projection arrangement is focused, and means to control the orientation of said arrangement in azimuth and vertically as a function of the relative motion of the iconoscope, of the parallax of the iconoscope, and of the assumed speed of the projectiles.

12. In an apparatus for gunnery training for pilots flying planes having fixed guns, in which the image of a target model and a representation of the fixed elements of space are projected onto a screen directly in front of the pupil pilot, and having means for imparting to said representation a motion corresponding to the imaginary relative motion of the imaginary plane controlled by the student pilot in relation to said fixed elements of space, as a function of the movements of the student controls effected by the student pilot, the provision of a target model, and of means for imparting to said target model a relative translation corresponding to the imaginary relative translation of the imaginary plane controlled by the teacher pilot in relation to said fixed elements of space and to the movements of the imaginary plane controlled by the student pilot, as a function of the movements of the teacher controls effected by the teacher pilot and of the student controls effected by the student pilot.

13. Apparatus as claimed in claim 12, characterized in that the means for imparting to the target model a relative translation includes an iconoscope and means to give to said iconoscope said relative translation.

14. Apparatus as claimed in claim 13, characterised in that the relative motion is controlled by an electric motor.

15. Apparatus as claimed in claim 13, characterised in that the motor is controlled by means of a calculating arrangement giving the imaginary relative speed of approach of the target model as a function of the imaginary speeds imposed by the pilot and the instructor respectively.

16. Apparatus as claimed in claim 13, characterised by the feature that the objective of the optical system of the iconoscope is capable of regulation as a function of the relative movement of the target model in relation to the iconoscope.

17. In the apparatus as claimed in claim 13, the provision of a projection arrangement, a screen in the immediate vicinity of the target model and on which said projection arrangement is focussed, and means to control the orientation of said arrangement in azimuth and vertically as a function of the rleative motion of the iconoscope and of the assumed speed of the projectiles.

18. In the apparatus as claimed in claim 17, the provision of means recording at a given instant the coincidence of the future point and of the axis of the imaginary plane controlled by the student pilot.

19. In the apparatus as claimed in claim 17, the provision of means signalling at a given instant the coincidence of the future point and of the axis of the imaginary plane controlled by the student pilot.

20. In an apparatus for gunnery training for pilots flying planes having fixed guns, in which the image of a target model and of at least a portion of the surface of a pictorial sphere on which are represented assumed fixed elements of space are projected onto a screen directly in front of the student pilot, and having means for imparting to said sphere a rotative motion corresponding to the imaginary plane controlled by the student pilot in relation to the assumed fixed elements of space, as a function of the movements of the student controls effected by the student pilot, the provision of means for imparting to the image of the target model variations of size and of appearance and a motion corresponding to the imaginary relative positions of flight of the imaginary plane controlled by the teacher pilot in relation to said fixed elements of space and to the movements of the imaginary plane controlled by the student pilot, as a function of the movements of the teacher controls effected by the teacher pilot and of the student controls effected by the student pilot.

21. Apparatus as claimed in claim 20, characterised in that the sphere is suspended by means of a universal arrangement and motions of the sphere in relation to the three directions of space are controlled by three electric motors respectively corresponding to the direction, to the rolling movement and to the pitching movement of the imaginary plane of the student pilot.

22. Apparatus as claimed in claim 21, characterised in that the student pilot controls include a control column and the motor which corresponds to the pitching movement is controlled by means of a calculating arrangement giving a transfer function A of the form $$\frac{1}{A}=\frac{Km}{p}=1+ap+bp^2$$

where $m$ is the depth component of the angle of the control column, P the incidence of the imaginary plane in relation to the horizontal, K, $a$, $b$ being constants.

23. Apparatus as claimed in claim 21, characterised in that the student pilot controls include a control for the ailerons and the motor which corresponds to the rolling movement is controlled by means of a calculating arrangement giving a transfer function B of the form:

$$\frac{1}{B}=\frac{Kn}{P}=1+ap+bp^2$$

in which $n$ is the component of the angle of the control column corresponding to the control of the ailerons, P the incidence of the imaginary plane with relation to the horizontal, K, $a$, $b$ being constants.

24. Apparatus as claimed in claim 21, characterised in that the motor which corresponds to the direction is controlled by means of a calculating arrangement giving a transfer function of the form:

$$C=\frac{1}{K'p+K''p^2}$$

where $p$ is the incidence of the imaginary plane in relation to the horizontal, K' and K'' being constants.

25. Apparatus as claimed in claim 20, characterised in that the rotation of the target model about a vertical axis and the rotation of the sphere about a vertical axis are controlled by two electric motors, respectively, the teacher controls include a rudder bar, and the motor which controls the rotation of the target model about a vertical axis is controlled by means of a calculating arrangement taking into account the rotation given by the motor which controls the rotation of the sphere about a vertical axis, and the imaginary rotation corresponding to the movement of the rudder bar of the instructor.

References Cited in the file of this patent
UNITED STATES PATENTS

| | | |
|---|---|---|
| 2,336,436 | Beindorf | Dec. 7, 1943 |
| 2,375,004 | Knowles | May 1, 1945 |
| 2,457,832 | Poorman | Jan. 4, 1949 |
| 2,471,315 | Dehmel | May 24, 1949 |
| 2,474,096 | Dehmel | June 21, 1949 |
| 2,502,834 | Dreyer | Apr. 4, 1950 |
| 2,510,529 | Takats | June 6, 1950 |
| 2,536,718 | Brandon | Jan. 2, 1951 |
| 2,560,527 | Dehmel | July 10, 1951 |
| 2,591,752 | Wicklund | Apr. 8, 1952 |

OTHER REFERENCES

Guanairstructor, Poper Mechanics Magazine, page 63, April 1944.